United States Patent Office 3,256,292
Patented June 14, 1966

3,256,292
THIAZOLIDINE-DIONE-THIONES
Paul J. Stoffel, St. Louis, Mo., assignor to Monsanto Company, a corporation of Delaware
No Drawing. Filed Sept. 23, 1963, Ser. No. 310,918
20 Claims. (Cl. 260—306.7)

This invention relates to a novel process and to useful compounds prepared thereby. More particularly, the compounds are useful in controlling harmful microorganisms such as fungi, insects and other harmful microorganisms.

The novel compounds are prepared by the reaction in accordance with the equation:

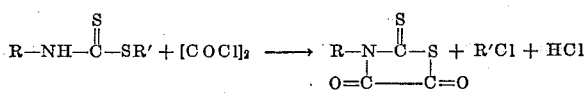

wherein R and R' are each selected from the group consisting of hydrocarbon radicals selected from the class consisting of alkyl having up to 12 carbon atoms, alkenyl having up to 12 carbon atoms, cycloalkyl having 3 to 8 carbon atoms, phenyl and benzyl; and the said hydrocarbon radicals having up to four substituents selected from the class consisting of chlorine, bromine, nitro, alkyl having up to four carbon atoms, alkoxy having up to four carbon atoms and phenyl.

The above described novel procedure involves contacting oxalyl chloride with esters of dithiocarbamic acid. Both the substituents on the nitrogen and the esterifying group may vary in the manner described above. Although the reaction may be conducted by mere physical contact with the reactants, such procedure often results in incomplete reaction or in an uncontrolled reaction. Preferred practice involves the contact of the reagents in a solvent medium. This procedure permits a less vigorous reaction and ultimately a more complete reaction by reason of the uniform nature of the reaction mixture.

An essential aspect of this invention is maintenance of a high temperature, for example 140 to 180° C. At temperatures below 140° C. a quite different reaction takes place and at temperatures in excess of 180° C. undesirable decomposition reactions take place. A preferred practice involves the dissolution of one of the reactants in the solvent medium and thereafter gradually introducing the second reactant to the solution. If desired, both reactants can be introduced to the solvent under conditions which permit little or no initial reaction. Such mixtures are then heated to temperatures within the range of 140° C. to 180° C. to accomplish the desired result. As set forth above, a reaction will take place between the reagents at temperatures below 140° C. but upon heating the mixture, a molecular rearrangement takes place and the desired compounds are processed.

The solvent used as the reaction medium may be any solvent for the reactants which is inert under the conditions of reaction. Suitable solvents of this type are the aromatic hydrocarbons and the halogen substituted aromatic hydrocarbons, for example benzene, toluene, xylene, chlorotoluene, bromobenzene, 1,4-dichlorobenzene and other aromatic and halogen substituted aromatic hydrocarbons. Since it is desirable to conduct the reaction at least to a larger portion of the reaction period at temperatures within the range of 140° C. to 180° C. it is generally desirable to select the solvent so that the reaction mixture can be refluxed within the said desirable temperature range.

Since hydrogen chloride is evolved in the course of the reaction, the progress of the reaction may be followed by the evolution of this gas. When the reaction has been completed to the desired extent, the product may be precipitated upon cooling of the reation mixture. Under some circumstances the product may remain dissolved in the reaction medium and in such cases precipitation may be induced by introducing a non-solvent to the product which is miscible with the solvent medium. Solvents of this type are the aliphatic petroleum fractions such as xylene, dichlorobenzene, kerosene or gasoline. The solid product so obtained is separated from the reaction solvents by filtering and may be purified by recrystallization in a suitable solvent, for example acetone and benzene.

Further details of the preparation and properties of the new compounds are set forth in the following examples.

*Example 1*

A solution of 18.8 grams of methyl 3,4-dichlorodithiocarbanilate and 10 grams of oxalyl chloride in 100 ml. of xylene was heated at reflux temperature for 24 hours. During the reaction HCl was evolved and the reaction mixture developed a yellow color. The xylene was evaporated at 50° C. under a vacuum. Upon recrystallization from a benzene solution bright orange needles (M.P. 150.5 to 151.2° C.) were obtained and found to have the structure:

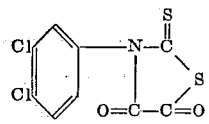

*Example 2*

A product identical to that produced by the procedure of Example 1 was prepared by reacting isopropyl 3,4-dichlorodithiocarbanilate with oxalyl chloride in a toluene medium.

*Example 3*

Using a procedure similar to that of Example 1 except that methyl cyclohexyldithiocarbamate was used in place of methyl 3,4-dichlorodithiocarbanilate a compound was formed and found to have the molecular structure:

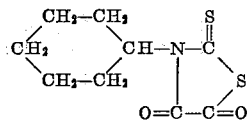

*Example 4*

The reaction of oxalyl chloride and benzyl p-methoxydithiocarbanilate in a bromobenzene solution. The mixture was heated at reflux temperature for six hours. When the evolution of hydrogen chloride had subsided the reaction mixture was cooled and the precipitated product recrystallized and identified as having the structure:

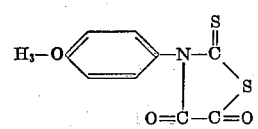

*Example 5*

Oxalyl chloride and phenyl N-ethyldithiocarbamate are reacted by heating at reflux temperature in a bromotoluene solution. The product so formed has the structure:

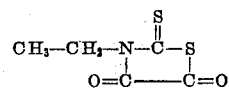

Example 6

Using the procedure of Example 1 oxalyl chloride and allyl N-allyldithiocarbamate are reacted to form a compound of the structure:

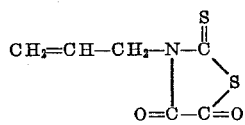

Example 7

The reaction of p-chlorobenzyl N-methyldithiocarbamate and oxalyl chloride in a toluene solution maintained under sufficient pressure so as to reflux between 140 and 150° C. produced a compound of the structure:

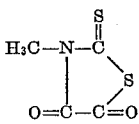

Example 8

Using the procedure described with respect to Example 1 oxalyl chloride and methyl N-dodecyldithiocarbamate were reacted to form a compound identified as having the structure:

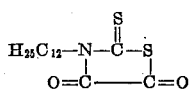

Example 9

The reaction between oxalyl chloride and methyl p-nitrodithiocarbanilate resulted in the formulation of a compound of the structure:

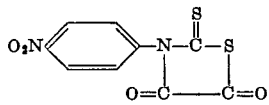

Example 10

Using the procedure described with respect to Example 1 oxalyl chloride and cyclopentyl n-2-ethylhexyldithiocarbamate were heated in chlorobenzene solution at a temperature between 150° C. and 160° C. under pressure such that reflux is permitted. The compound recovered was identified as that having the structure:

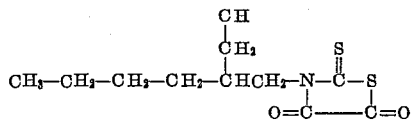

Although the invention is described with respect to specific modifications, it is not intended that the details thereof are limitations on the scope of the invention except to the extent incorporated in the following claims.

What is claimed is:

1. A compound of the formula:

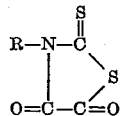

wherein R is selected from the group consisting of hydrocarbon selected from the class consisting of alkyl having up to 12 carbon atoms, alkenyl having up to 12 carbon atoms, cycloalkyl having 4 to 8 carbon atoms, phenyl and benzyl; and the said hydrocarbon having up to four substituents selected from the class consisting of chlorine, bromine, nitro, alkyl having up to four carbon atoms, alkoxy having up to four carbon atoms and phenyl.

2. The method of preparing a compound of the formula:

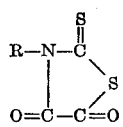

which comprises reacting at a reflux temperature above 140° C. a compound of the formula:

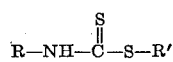

wherein R and R' are each selected from the group consisting of hydrocarbon selected from the class consisting of alkyl having up to 12 carbon atoms, alkenyl having up to 12 carbon atoms, cycloalkyl having 4 to 8 carbon atoms, phenyl and benzyl; and the said hydrocarbon having up to four substituents selected from the class consisting of chlorine, bromine, nitro, alkyl having up to four carbon atoms, alkoxy having up to four carbon atoms and phenyl with oxalyl chloride.

3. A compound of the formula:

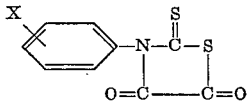

wherein X is a halogen atom.

4. The method of preparing a compound of the formula:

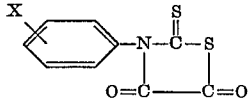

wherein X is a halogen atom, which comprises heating oxalyl chloride and a dithiocarbamate of the formula:

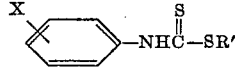

wherein R' is alkyl having up to 12 carbon atoms, at a temperature between 140° C. and 180° C.

5. A compound of the formula:

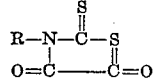

wherein R is cycloalkyl having from 4 to 8 carbon atoms.

6. The method of preparing a compound of the formula:

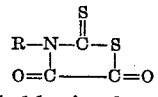

wherein R is cycloalkyl having from 4 to 8 carbon atoms which comprises heating oxalyl chloride with a dithiocarbamate of the formula:

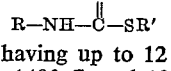

wherein R' is alkyl having up to 12 carbon atoms, at a temperature between 140° C. and 180° C.

7. A compound of the formula:

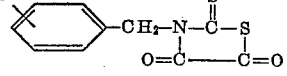

wherein R is alkyl having up to four carbon atoms.

8. The method of preparing a compound of the formula:

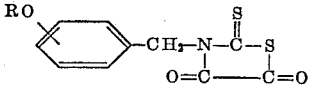

wherein R is alkyl having up to four carbon atoms which comprises heating oxalyl chloride and a dithiocarbamate of the formula:

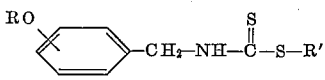

wherein R' is alkyl of up to 12 carbon atoms, at a temperature between 140° C. and 180° C.

9. A compound of the formula:

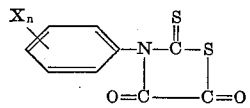

wherein X is a halogen atom and $n$ is an integer from 0 to 4.

10. The method of preparing a compound of the formula:

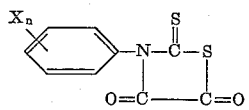

wherein X is a halogen atom and $n$ is an integer from 0 to 4, which comprises heating oxalyl chloride with a carbanilate of the formula:

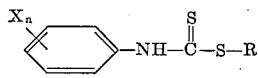

wherein R' is cycloalkyl having from 4 to 8 carbon atoms, at a temperature between 140° C. and 180° C.

11. The compound of the formula:

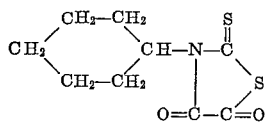

12. The method of preparing a compound of the formula:

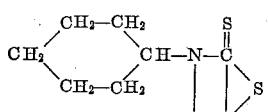

which comprises heating at reflux temperature methyl cyclohexyldithiocarbamate and oxalyl chloride in an inert aromatic solvent boiling between 140° C. to 180° C.

13. A compound of the formula:

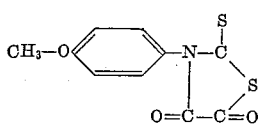

14. The method of preparing a compound of the formula:

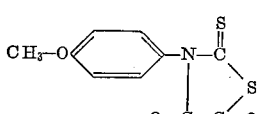

which comprises heating at reflux temperature oxalyl chloride and benzyl-p-methoxydithiocarbanilate in an inert aromatic solvent boiling between 140° C. to 180° C.

15. A compound of the formula:

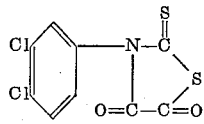

16. The method of preparing a compound of the formula:

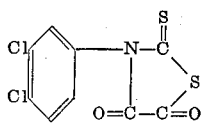

which comprises heating at reflux temperature oxalyl chloride and phenyl 3,4-dichlorodithiocarbanilate in an inert aromatic solvent boiling between 140° C. and 180° C.

17. A compound of the formula:

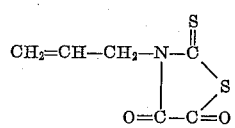

18. The method of preparing a compound of the formula:

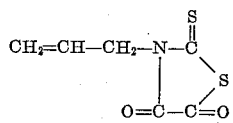

which comprises heating at reflux temperature oxalyl chloride and allyl N-allyldithiocarbamate in an inert aromatic solvent boiling between 140° C. and 180° C.

19. A compound of the formula:

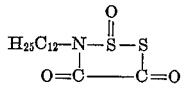

20. The method of preparing a compound of the formula:

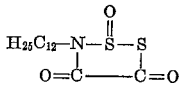

which comprises heating at reflux temperature oxalyl chloride and methyl N-dodecyldithiocarbamate in an inert aromatic solvent boiling between 140° C. and 180° C.

References Cited by the Examiner

Burger, Medicinal Chemistry (New York, 1960), pages 77–81.

NICHOLAS S. RIZZO, *Primary Examiner.*

ALTON D. ROLLINS, *Assistant Examiner.*